US010422561B2

(12) United States Patent
Blaauwgeers

(10) Patent No.: US 10,422,561 B2
(45) Date of Patent: Sep. 24, 2019

(54) RECUPERATIVE TRAPPING STAGE, REFRIGERATOR COMPRISING A RECUPERATIVE TRAPPING STAGE AND METHOD OF CLEANING A RECUPERATIVE TRAPPING STAGE

(71) Applicant: BLUEFORS CRYOGENICS OY LTD, Helsinki (FI)

(72) Inventor: Rob Blaauwgeers, Helsinki (FI)

(73) Assignee: BLUEFORS CRYOGENICS OY LTD, Helsinki (FI)

( * ) Notice: Subject to any disclaimer, the term of this patent is extended or adjusted under 35 U.S.C. 154(b) by 4 days.

(21) Appl. No.: 15/324,711

(22) PCT Filed: Jul. 8, 2015

(86) PCT No.: PCT/EP2015/065628
§ 371 (c)(1),
(2) Date: Jan. 8, 2017

(87) PCT Pub. No.: WO2016/005463
PCT Pub. Date: Jan. 14, 2016

(65) Prior Publication Data
US 2017/0211859 A1 Jul. 27, 2017

(30) Foreign Application Priority Data
Jul. 9, 2014 (DE) .................. 10 2014 109 632

(51) Int. Cl.
*F25B 43/00* (2006.01)
*F25D 19/00* (2006.01)
(Continued)

(52) U.S. Cl.
CPC ............. *F25B 43/003* (2013.01); *B01D 8/00* (2013.01); *F25B 9/10* (2013.01); *F25D 19/006* (2013.01)

(58) Field of Classification Search
CPC ...................................... B01D 8/00; F25B 9/12
(Continued)

(56) References Cited

U.S. PATENT DOCUMENTS 2,177,139 A * 10/1939 Horvitz .................... B01D 8/00
62/637
2,317,814 A 4/1943 Schuchmann et al.
(Continued)

FOREIGN PATENT DOCUMENTS

| JP | H11 29301 A | 2/1999 |
| JP | H11 118349 A | 4/1999 |
| JP | 2009 148721 A | 7/2009 |

OTHER PUBLICATIONS

Sawada et al., "Liquid helium cooled trap of a coaxial type for a He—He dilution refrigerator", Cryogenics, 1986, vol. 26, Aug./Sep., pp. 486-487.
(Continued)

*Primary Examiner* — Tareq Alosh
(74) *Attorney, Agent, or Firm* — Millman IP Inc.

(57) ABSTRACT

The present invention relates to a recuperative trapping stage (3) for a refrigerator or refrigerator system. The recuperative trapping stage (3) comprises at least one first portion and at least one second portion configured for conveying fluids, wherein the first portion is in fluid communication with the second portion and wherein at least one part of the second portion is arranged within the first portion. Further the present invention relates to a refrigerator with at least one recuperative trapping stage (3) according to the present invention and with at least one cooler (1), the cooler (1) having at least one cold stage, wherein at least a part or section of the first portion of the at least one recuperative trapping stage (3) is thermally coupled, or at least configured to be thermally coupleable, to the at least one cold stage. Finally the present invention relates to a method of cleaning
(Continued)

Figure 1:
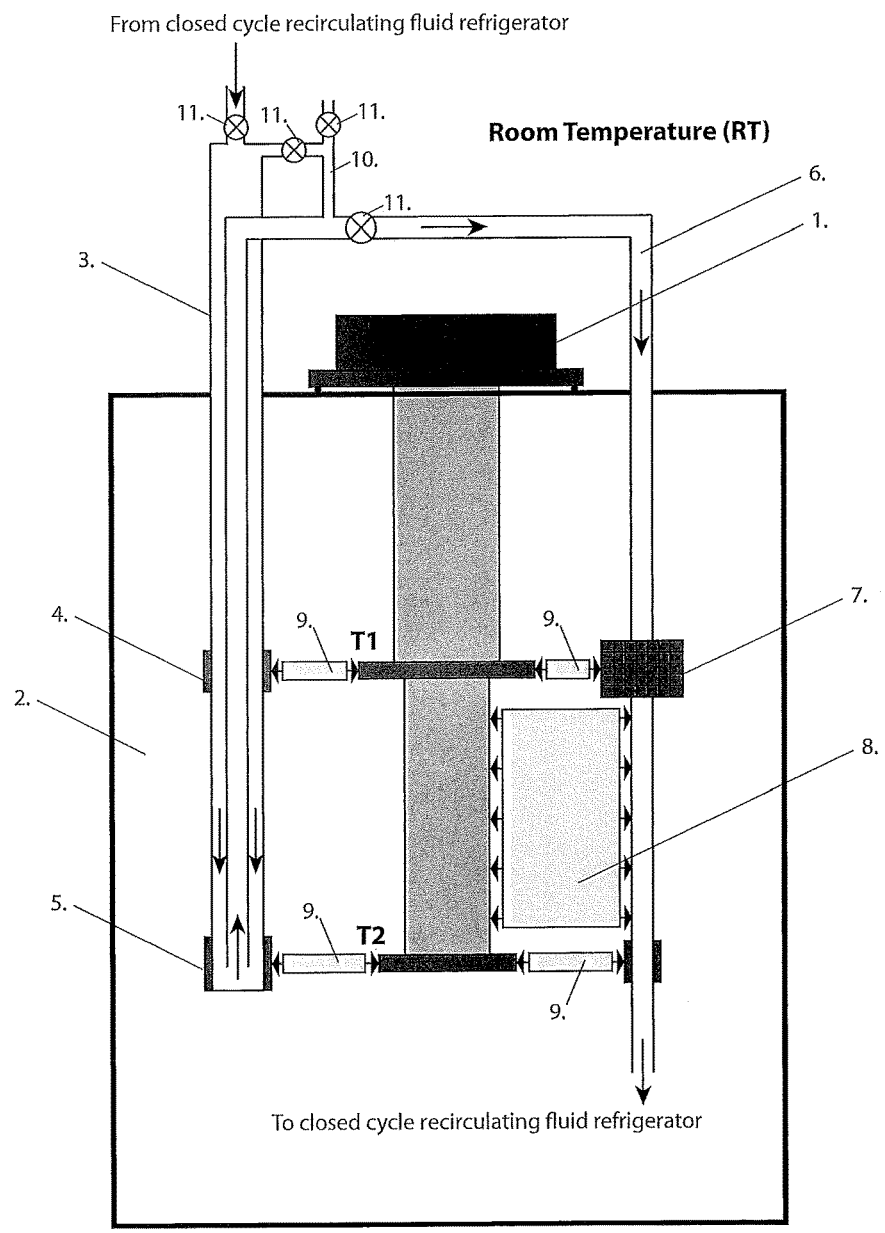

at least one recuperative trapping stage (3) in a refrigerator according to the present invention.

11 Claims, 2 Drawing Sheets

(51) Int. Cl.
 B01D 8/00 (2006.01)
 F25B 9/10 (2006.01)
(58) Field of Classification Search
 USPC .................................................. 62/55.5, 51.2
 See application file for complete search history.

(56) References Cited

U.S. PATENT DOCUMENTS

| | | | | |
|---|---|---|---|---|
| 2,370,703 | A * | 3/1945 | Zaikowsky | G01N 25/14 165/65 |
| 2,831,549 | A * | 4/1958 | Alpert | B01D 8/00 34/80 |
| 3,517,521 | A * | 6/1970 | Emerson | F25J 3/028 62/55.5 |
| 3,656,313 | A | 4/1972 | Low et al. | |
| 2003/0154728 | A1 * | 8/2003 | Perin | F17C 3/085 62/55.5 |
| 2005/0235693 | A1 | 10/2005 | Hersman | |
| 2014/0137571 | A1 | 5/2014 | Petroff et al. | |
| 2014/0326001 | A1 * | 11/2014 | Citver | B01D 8/00 62/55.5 |

OTHER PUBLICATIONS

Pobell, Frank, "Matter and Methods at Low Temperatures", Springer, 2007, pp. 176-188.
PCT/EP2015/065628 International Search Report, dated Oct. 16, 2015, European Patent Office.
Uhlig, K.; Hehn, W., "3He/4He dilution refrigerator precooled by Gifford-McMahon refrigerator", Cryogenics 37, Elsevier Science Ltd., 1997, pp. 279-282.
Piatek, J., "Operation of the Kelvinox Dilution Fridge under Different Temperatures Regimes", École Polytechnique Fédérale de Lausanne; Laboratory for Quantum Magnetism, 2008, pp. 1-7.
Hollister, M. et al. "Performance of the SCUBA-2 dilution refrigerator", Proc. of SPIE, vol. 7020, 2008.

* cited by examiner

→ Fluid criculation direction in normal operation
T2 < T1 < RT in normal operation → Fluid criculation direction in normal operation
T2 < T1 < RT in normal operation

RECUPERATIVE TRAPPING STAGE, REFRIGERATOR COMPRISING A RECUPERATIVE TRAPPING STAGE AND METHOD OF CLEANING A RECUPERATIVE TRAPPING STAGE The present invention relates to a recuperating cold trap or recuperative trapping stage for a refrigerator or refrigerator system, in particular for a refrigerator with a closed-cycle circulating fluid system. The present invention relates further to a refrigerator or refrigerator system with at least one of such a recuperating cold trap or recuperative trapping stage and to a cleaning and/or a replacement method of at least such a recuperating cold trap or recuperative trapping stage.

In closed-cycle refrigerators there is always a small, but unavoidable, amount of impurities diffusing into the system in particular through seals mostly having some remaining leakiness, for example O-ring seals, in particular in pumps and/or in vacuum connections. These impurities may condensate or freeze somewhere in the system, in particular in the incoming or condensing line, and may eventually block the system.

Some cold traps for trapping these impurities before the fluid is directed to the incoming or condensing line of the system are already known in the art. For example, at least a portion of the incoming line at room temperature may be conducted through a liquid nitrogen bath before being injected into the condensing system.

One object of the present invention is to provide another cold trap arrangement or trapping stage for trapping impurities in a refrigerator, in particular in a refrigerator with a closed-cycle circulating fluid system. Another object of the present invention is to provide a method of cleaning at least a trapping stage and/or of exchanging at least one trapping stage, in particular in, respectively from, a refrigerator, in particular one comprising a closed-cycle circulating fluid system.

This object is solved by a recuperating cold trap or recuperative trapping stage according to claim 1 and by a refrigerator with at least one of such a recuperative trapping stage according to claim 7. This object is also solved by a method of cleaning such a recuperative trapping stage according to claim 14, in particular in a refrigerator according to the present invention.

A recuperative trapping stage according to the present invention comprises at least one first portion and at least one second portion, both configured for conveying fluids. Thereby, the first portion is in fluid communication with the second portion and at least one part of the second portion is arranged within the first portion.

A refrigerator according to the present invention comprises at least one cooler having at least one cold stage and at least one recuperative trapping stage according to the present invention. Thereby, at least a part or section of the first portion of the at least one recuperative trapping stage is thermally coupled, or at least configured to be thermally coupleable, to the at least one cold stage of the refrigerator.

A method of cleaning at least one recuperative trapping stage in a refrigerator according to the present invention comprises at least one of the step of warming up and/or interrupting cooling of at least one section of the at least one recuperative trapping stage, of flushing the recuperative trapping stage with a cleaning fluid and/or of evacuating the recuperative trapping stage.

In the following, the use of the expression "may be" or "may have" and so on, may be understood synonymously with "in exemplary embodiments is" or "in exemplary embodiments has", respectively, and so on, and is intended to illustrate exemplary embodiments according to the present invention.

Exemplary embodiments according to the present invention may comprise one or more of the following features.

In certain embodiments, the expression "stage" may mean a particular point, plane and/or platform of a refrigerator or generally cooler, having a particular temperature, in particular in a state of use of the refrigerator, for example in a cooled state or during cooling.

In some embodiments, the expression "first stage" means a stage having a higher temperature than a "second stage" in a state of use of the refrigerator, and inversely.

In certain embodiments, the expression "recuperating" or "recuperative" may mean "thermally compensated".

The expressions "recuperating cold trap" or "recuperative trapping stage" are used herein as synonym.

Usually, the impurities mainly consist of air and/or of waste products produced by some pumps and/or compressors, such as oil and/or particles raising from abrasion. These impurities will condensate and/or freeze somewhere in the system, in particular in the condensing line, eventually blocking it.

In order to prevent such a blocking, a cold trap may be inserted into the condensing or injecting line (6), in particular at a $1^{st}$ and/or at a $2^{nd}$ stage of a refrigerator or cryocooler, for example at a $1^{st}$ and/or at a $2^{nd}$ stage of a pulse tube cooler cold head or of a Gifford-McMahon (GM) cooler cold head. The cold trap may be a chamber filled with a material having a relatively large surface area. The impurities will then freeze and/or condensate on this surface, thus trapping them.

Additionally, for any cold trap design there will always occur a break-through, i.e. the cold surfaces are or will someday getting saturated with impurities and the cryocondensation and/or freezing within the trap becomes less effective. Initially, the cold trap will not let any impurities pass, but after a certain amount of trapped impurities, unavoidably, a small fraction of the newly incoming impurities will pass with the disadvantages discussed before. Even after such a break-through has occurred, i.e. after the cold trap saturates, only a small fraction of the impurities will however pass through the cold trap or trapping stage, in particular because the overall leak-rate of the system is very low.

The present invention is based on the recognition that one solution for further increasing the operating time of a closed-cycle fluid system is to place 2 or more trapping stages or cold traps in series. Thus, it will takes a long or at least a certain amount time for a next trapping stage also to get saturated, i.e. before the next break-through of a following cold trap(s) or trapping stage(s) occur.

Another important point is that the total amount of trapped impurities before break-through increases significantly the lower the temperature of a trapping stage or cold trap get or is. In other words, the effectiveness of the impurity trapping increases with decreasing temperature of the trap.

As for an example, a trapping stage or a cold trap that is only cooled to the $1^{st}$ stage (for example of a pulse tube) will have a relatively small break-through threshold. Therefore, for the $1^{st}$ trapping stage(s) the cooling should be either all the way to the $2^{nd}$ stage or somewhere at a temperature between that of the $1^{st}$ and $2^{nd}$ stage, for example for a system with a pulse tube by having a cooling stage attached to the $2^{nd}$ stage regenerator and/or to the pulse tube of the cold head. The same considerations may apply in a similar manner for other coolers cold heads, like Gifford-McMahon (GM) coolers and/or any other suitable cooler.

In circulating fluid refrigerators, in particular in circulating helium refrigerators, the incoming gas will induce a significant thermal load to the $2^{nd}$ stage, for example of the pulse tube cooler. In order to reduce the heat load to the $2^{nd}$ stage the final injection stage may typically have a heat exchanger to the $2^{nd}$ stage regenerator (reference 8 of the figure) and/or to the cold head. It is therefore important that the trapping stage(s) or cold trap(s) before the fluid is finally injected into the system is (are) of a recuperative design in term of thermal load and/or that the heat input is minimized. The present invention is based on the recognition that a heat exchange between the incoming fluid flow to low temperatures and the outgoing flow (see arrow representing fluid direction during use in the recuperating cold trap with the reference 3 in the figure) to higher temperatures (for example RT) in the recuperating trapping stage(s) or cold trap(s) advantageously contribute to solve this issue.

The inventor found out that a recuperating cold trap or stage designed and/or configured at least partially for example as a simple double-walled tube and/or as a tube in or within a heat exchanger, the exchanger being for example of tubular shape, already works efficiently as a recuperating trapping stage.

In some embodiments according to the present invention, the recuperative trapping stage comprises at least one connecting portion, for example a fluid input or output connection section, configured to be connected or to be connectable, in particular in a detachable manner, with at least one of a fluid supply, a gas-system, a condensing line of a closed-cycle recirculating fluid system, a cleaning fluid system and a further recuperative trapping stage.

In some embodiments according to the present invention, the fluid communication is realized through one single fluid communication portion arranged between the end of the first portion and the beginning of the second portion of the recuperative trapping stage.

In particular embodiments according to the present invention, the recuperative trapping stage comprises only a single one fluid communication portion between the first portion and the second portion of the recuperative trapping stage.

In certain embodiments according to the present invention, the first and/or the second portion of the recuperative trapping stage comprise(s) at least one connection section. A connection section may in particular be arranged at the beginning of the first portion and/or at the end of the second section of the second portion.

In certain embodiments according to the present invention, the beginning of the first portion of the recuperative trapping stage may be connected, or at least configured to be connectable, to a fluid supply, a servicing valve arrangement and/or servicing valves, a gas handling system, a fluid circuit of a closed-cycle recirculating fluid system and/or to the end of the second portion of a further recuperative trapping stage or a hereto corresponding connecting portion.

In some embodiments according to the present invention, the end of the second portion of the recuperative trapping stage may be connected, or at least configured to be connectable, to a condensing line, a fluid circuit of a closed-cycle recirculating fluid system, a gas handling system and/or to the beginning of the first portion of a further recuperative trapping stage or a hereto corresponding connecting portion.

In certain embodiments according to the present invention, the recuperative trapping stage may form part of the condensing line and/or of the closed-cycle recirculating fluid system and/or refrigerator.

In particular embodiments according to the present invention, the second portion of the recuperative trapping stage, or at least parts thereof, is/are arranged concentrically within the first portion of the recuperative trapping stage.

In certain embodiments according to the present invention, the cross-section of the first and/or of the second portion of the recuperative trapping stage are circular. However, any other shape of the cross-section may equally also be contemplated.

In some embodiments according to the present invention, at least a part of the recuperative trapping stage is arranged within the vacuum can of the refrigerator and at least a part of the recuperative trapping stage is arranged in an outside of the vacuum can. For this, the recuperative trapping may comprise a sealing and/or mounting portion, in particular a fluid-tight, for example a vacuum-tight portion.

In particular embodiments according to the present invention, the fluid communication portion is arranged in a part of the recuperative trapping stage being arranged within the vacuum can.

In certain embodiments according to the present invention, every connection, in particular fluid connection, of the fluid circuit, of the recuperative trapping stage, of the condensing line and/or of the closed-cycle recirculating fluid system are configured to be fluid-tight and/or vacuum-tight.

In some embodiments according to the present invention, the servicing valve arrangement and/or the servicing valves may be manipulated, arranged, controlled and/or have at least a position such that the recuperative trapping stage may be isolated from a remaining fluid circuit or fluid circuit portion, in particular from the closed-cycle recirculating fluid system. In other words, the recuperative trapping stage may be by-passed. In particular, the servicing valve arrangement and/or the servicing valves may be manipulated and/or have at least a position such that the flow of working fluid through the remaining parts of the closed-cycle recirculating fluid system does not need to be interrupted.

Further, the recuperative trapping stage may be additionally connected, or at least configured to be connectable, to a cleaning fluid circuit, being in particular independent of the previously cited closed-cycle recirculating fluid system. Thus, it may be possible to clean the recuperative trapping stage without having to disconnect and/or to remove the recuperative trapping stage completely from the refrigerator according to the present invention.

In certain embodiments according to the present invention, the refrigerator and/or the recuperative trapping stage may comprise at least one heating device for heating at least a part of the recuperative trapping stage and/or of the refrigerator. Such a heating device may in particular be used during execution of a cleaning step or method.

In some embodiments according to the present invention, the closed-cycle recirculating fluid system may be part of a closed-cycle fluid recirculating system and/or refrigerator.

In certain embodiments according to the present invention, the refrigerator or refrigerator system comprises at least a control unit configured to at least control or regulate at least the flow of fluid flowing through the closed-cycle recirculating fluid system and/or refrigerator, at least a heating device, at least a control switch or link and/or at least one servicing valve.

In some embodiments according to the present invention, the fluid or fluids, in particular working and/or cleaning fluid(s) may be conveyed by at least a pump and/or a compressor.

In certain embodiments according to the present invention, at least the first portion of the recuperative trapping stage comprises at least one heat exchange portion and/or supports at least one heat exchange device, in particular a heat exchanger. A heat exchanger or heat exchange device may be connected to, attached with and/or forms part of the first portion of the recuperative trapping stage.

In some embodiments according to the present invention, at least a heat exchanger is arranged, connected to, attached with and/or at least forms part of the fluid communication portion.

In certain embodiments according to the present invention, an arrangement or cold traps arrangement may in particular mean an arrangement of cold traps comprising at least one recuperative trapping stage. An arrangement may however additionally comprise, in particular conventional, further cold traps.

In some embodiments according to the present invention, at least a portion of the recuperating cold trap is arranged and/or located in a vacuum space or can of the refrigerator.

In certain embodiments according to the present invention, the circulating fluid may be a gas and/or a liquid, in particular Helium, for example He-3 and/or He-4.

In particular embodiments according to the present invention, the refrigerator is pulse tube (PT) based and/or uses a Gifford-McMahon (GM) cooler.

In some embodiments according to the present invention, the refrigerator may comprise a closed-cycle fluid circulating system and may have a dilution and/or pumping unit, for example for He-3 and/or He-4, and/or at least a Joule Thomson (JT) stage.

In certain embodiments according to the present invention, the refrigerator comprises at least one cooler having at least one cold stage.

In some embodiments according to the present invention, the cooler is a pulse tube, in particular with at least two cold stages.

In certain embodiments according to the present invention, the refrigerator comprises a condensing line, at least partially arranged within the vacuum can of the refrigerator. The condensing line may be part of a closed-cycle recirculating fluid system and/or refrigerator. The condensing line may be connected, or at least be configured to be connectable, to a recuperative trapping stage according to the present invention.

In some embodiments according to the present invention, the closed-cycle recirculating fluid system may comprise at least a condensing line, a recuperative trapping stage according to the present invention, at least one conventional cold trap, a gas handling system with respective pumps, compressors and/or valves, and/or a closed-cycle fluid recirculating refrigerator or unit. The closed-cycle recirculating fluid system may be part of the refrigerator or refrigerator system according to the present invention.

In certain embodiments according to the present invention, the refrigerator may comprise at least a servicing valve arrangement and/or at least one servicing valve by means of which the fluid flow through the fluid circuit and/or the recuperative trapping stage may be controlled or regulated, for example interrupted and/or enabled.

In particular embodiments according to the present invention, the servicing valves and/or the servicing arrangement may be manually and/or automatically, for example remote, controlled and or controllable.

In some embodiments according to the present invention, the cooler may have at least two, or more, cold stages.

In certain embodiments according to the present invention, at least two different parts or sections of the first portion of the at least one recuperative trapping stage are respectively thermally coupled, or at least configured to be respectively thermally coupleable, to different cold stages of the cooler.

In some embodiments according to the present invention, the refrigerator comprises two or more recuperative trapping stages mounted in series.

In certain embodiments according to the present invention, at least a part of each respective first portion of each recuperative trapping stage is thermally coupled, or at least configured to be thermally coupleable, to a cold stage of the refrigerator respectively and/or to a part of the first portion of at least another recuperative trapping stage.

In some embodiments according to the present invention, a thermal coupling is achieved by means of at least one of a, in particular reversible, mechanical connection, a thermal link, a thermo-switch and a heat exchanger.

In certain embodiments according to the present invention, at least one heat exchanger is attached to, connected with and/or forms part of the first portion of the recuperative trapping stage.

In some embodiments according to the present invention, the refrigerator comprises at least a condensing line and/or at least a heat exchanger.

In certain embodiments according to the present invention, the at least one heat exchanger is thermally coupled, or at least configured to be thermally coupleable, to the regenerator of a cooler of the refrigerator.

In some embodiments according to the present invention, the refrigerator comprises at least a condensing line in which at least one conventional cold trap is arranged. The at least one conventional cold trap may in particular preferably be arranged downstream, with regard to a fluid direction in a state of use of the refrigerator, a recuperative trapping stage according to the present invention.

In some embodiments according to the present invention, at least one recuperating cold trap (references 3, see FIG. 2) may be arranged in series with at least one, or more, further recuperating cold trap(s) or trapping stage(s).

Alternatively or additionally, in certain embodiments according to the present invention, at least one recuperating cold trap (reference 3, see figures) may be arranged in series with at least one or more, in particular usual, cold trap(s) or trapping stage(s) (reference 7 of the figure) of the condensing line (reference 6 of the figure).

Figure 2:
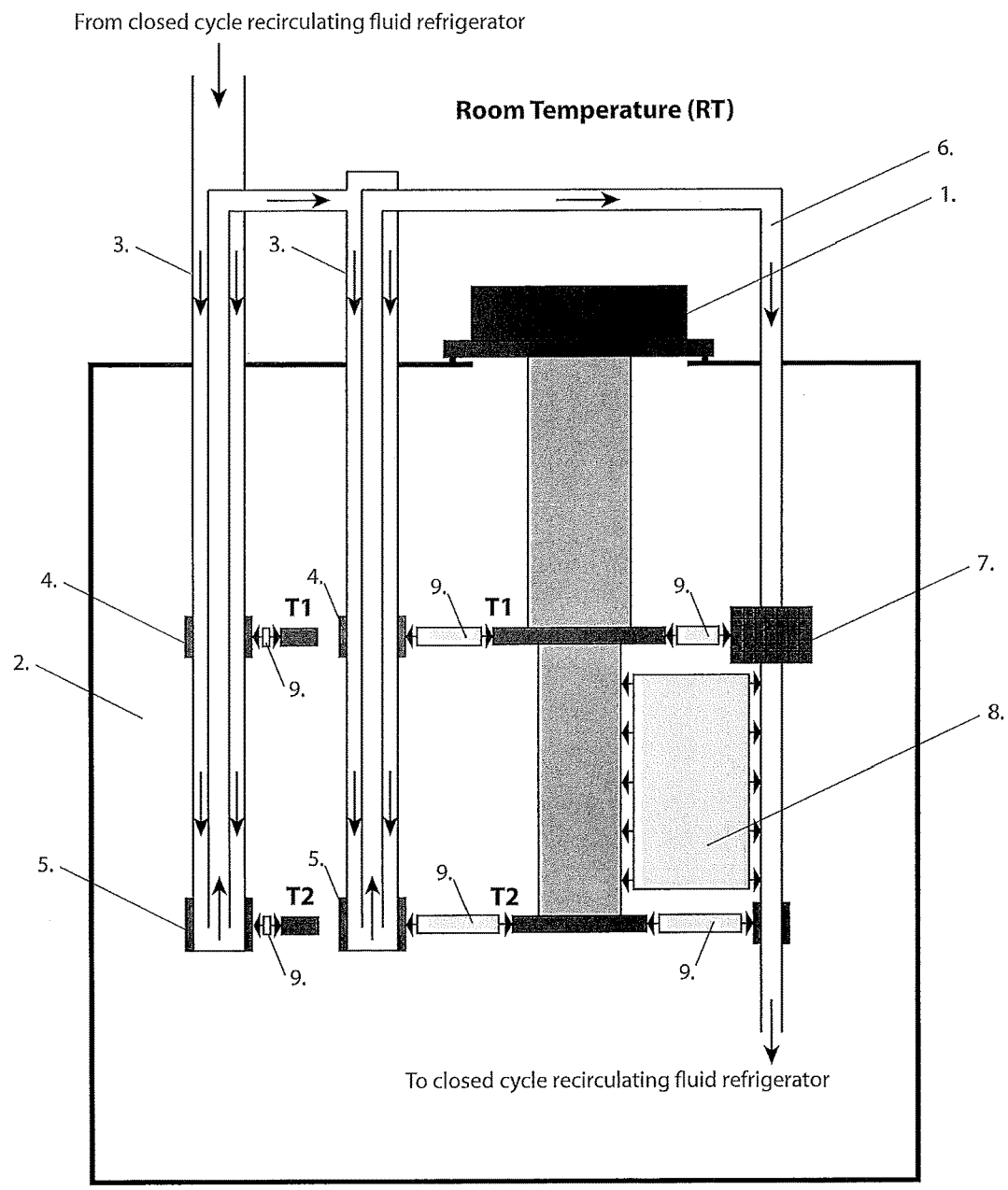

In certain embodiments according to the present invention, the condensing line does not include or comprise any additional usual cold trap or trapping stage (reference 7 in FIG. 2).

In particular embodiments according to the present invention, the recuperating cold trap is not filled with a material for trapping the impurities. In alternative particular embodiments, at least one of the recuperating cold trap is at least partially filled with a material for trapping the impurities.

In some embodiments according to the present invention, the external surface of the heat exchanger or of the cold trap may be thermally connected or thermally connectable, for example by means of a thermal connection and/or of a thermo-switch (reference 9), at least to one stage or position of the refrigerator and/or cooler.

In particular embodiments according to the present invention, the surface of an inner tube or volume of the recuperating cold trap may be thermally connected to a surrounding volume or tube of the recuperating cold trap.

In some embodiments according to the present invention, said tube of the recuperating cold trap may have any other suitable shape and/or configuration, in particular another section.

In particular embodiments according to the present invention, at least a recuperative cold trap may be formed as a spiral.

In certain embodiments according to the present invention, the recuperative trapping stage(s) may have sufficiently large diameters in order that the recuperative trapping stage(s) or cold trap(s) itself are/is not blocked.

In certain embodiments according to the present invention, one, some or all of the recuperative trapping stage(s) or cold traps may be individually connectable, deconnectable, releasable, removable and/or may be bypassed for example by means of appropriate valves and/or valve arrangement(s) (see FIG. 1 reference 10 and 11), in particular independently of each other's.

In some embodiments according to the present invention, one, some or all of the trapping stage(s) or cold trap(s), in particular recuperating cold trap(s), may be connected and/or configured to be connectable, in particular in terms of thermal connection, to one, two or more stages of the refrigerator, wherein the stages may be the same or may be different ones.

In certain embodiments according to the present invention, there may be one, two or more stages, in particular between the first and the second stage.

In some embodiments according to the present invention, a recuperating cold trap, for example being saturated or broken, may be exchanged by means of removing and replacement through a new one and/or cleaned, for example by warming it up or pumping it, in an easy way. The invention may comprise corresponding adapted methods, which may be executed automatically or manually.

In certain embodiments according to the present invention, the cleaning method further comprises at least the step of interrupting or by-passing a working fluid flow through the at least one recuperative trapping stage.

In some embodiments according to the present invention, the fluid flow through the remaining fluid flow system, in particular a closed-cycle recirculating fluid system or circuit, or parts thereof, for example a condensing line, is or may not be interrupted during execution of the cleaning.

The present invention has at least the advantage that ideally, i.e. for ideal heat exchanger properties of the recuperating cold trap(s) or trapping stage(s), such a trapping stage(s) or cold trap(s) would induce almost zero thermal load because of the heat exchange due to the fluid flow.

One particular advantage achievable by the present invention is that the operating time of the system is therefore increased and/or not limited by the saturation time of a single cold trap(s).

Further, in some embodiments, the circulation has not to be interrupted for replacing a recuperating cold trap.

In the figures, identical reference numerals denote the same, identical or similar components. The following applies:

FIG. 1 shows, in a simplified illustration, a first exemplary refrigerator according to the present invention; and FIG. 2 shows, in a simplified illustration, a first exemplary refrigerator according to the present invention.

In FIG. 1, the long arrow shows the fluid circulation direction in a state of use of the refrigerator in normal operation, in particular during cooling or in a cooled state of the refrigerator. Expressions like "downstream" and/or "upstream" may relate to this direction.

With intent to explain the principle of the present invention it is referred in FIG. 2 to a cooler having two cooling stages, for example a pulse tube cooler. In a normal operation state, in particular during cooling, the temperature T1 of the first stage of the cooler 1 is higher than the temperature T2 of the second stage of the cooler 1. In a normal operation state, both T1 and T2 are higher than the temperature outside the vacuum can 2, e.g. room temperature.

FIG. 1 shows, in a simplified illustration, a first exemplary refrigerator according to the present invention. The refrigerator comprises a vacuum can 2, a cooler 1 with at least a cold head, in this example for example a pulse tube cooler with two cold heads as illustrated in FIG. 1, a trapping stage 7, a condensing line 6 and a recuperative trapping stage 3. Optionally, the refrigerator may also comprises a servicing valve arrangement 10 and servicing valves 11 for controlling and/or regulating the flow of fluid through the condensing line and/or the recuperative trapping stage 3.

The condensing line 6, the recuperative trapping stage 3 and the trapping stage 7 may be part or form part of a non-illustrated closed cycle fluid circulating system.

The cold head(s) or cold stage(s) of the cooler 1 is/are arranged in a fluid-tight manner in an inside of the vacuum can 2. The same applies for the trapping stage 7, the heat exchanger 8 and at least parts of the condensing line 6 and of the recuperative trapping stage 3. The optional servicing valve arrangement 10 and valves 11 are arranged in an outside of the vacuum can 2 of the refrigerator.

The valve arrangement 10 is connected and/or connectable with both the recuperative trapping stage 3 and the condensing line 6 in a fluid-tight manner.

At least one portion or section of the condensing line 6 and/or of the recuperative trapping stage 3 are arranged in an outside of the vacuum can 2 of the refrigerator. The valve arrangement 10 is configured to isolate the recuperative trapping stage 3, in particular its volume, from the condensing line 6 and/or from the closed-cycle recirculating fluid system by means of a respective manipulation of the valves 11 and/or the valve arrangement 10. This may enable for example a cleaning and/or exchange of the recuperative trapping stage. The valve arrangement 10 and corresponding valves 11 may be connected to other devices, e.g. pumps, compressors, reservoirs, control units or the like and/or may be part of a fluid handling system of the closed-cycle fluid refrigerator or system, in particular a gas handling system. The connection may comprise a connection for data communication.

The recuperative trapping stage 3 is configured for conveying a fluid and is configured to be connected or to be connectable at least on one side with a fluid supply, a condensing line 6 and/or another recuperative trapping stage 3. The recuperative trapping stage 3 comprises therefore at least a fluid input and a fluid output connection section. The recuperative trapping stage 3 comprises further a first section or portion and a second portion or section. Each section is configured for conveying or leading a fluid from its begins to its end. The first portion is connected or begins with a fluid input connection section. The second section, or at least part thereof, is arranged inside the first section, for example concentrically within the first section. At least a last or end part of the second section may extend out the first portion in the region of the fluid output. The second section is connected or ends with a fluid output connection section. The first and the second portions are in fluid communication, in particular they are in fluid connection through a single fluid communication portion only. The fluid connection or fluid communication portion between the first and the second portion is arranged in a portion of the recuperative trapping stage 3 which is thermally coupled or coupleable with the lowest temperature stage of the cooler 1. In the example depicted in FIG. 1, the lowest temperature stage is the second stage of the cold head of the pulse tube cooler 1 having a temperature T2 lower than T1 in a state of use of the refrigerator, in particular in a cooling or cooled state. A fluid entering the recuperative trapping stage 3 through a fluid input may therefore be conveyed or lead through the first section and the second section to the fluid output and/or to the condensing line 6.

The recuperative trapping stage 3 is configured to be partly arranged in an inside and in an outside of the vacuum can 2 of the refrigerator in a fluid-tight manner. The recuperative trapping stage 3 and/or the refrigerator may for this end comprise a corresponding seal or sealing device (not illustrated).

The recuperative trapping stage 3 comprises exemplarily a first heat exchanger 4 which is arranged inside the vacuum can 2 and is thermally coupled, or at least configured to be coupleable, with the at least one cold head or stage of the cooler 1 and to at least a part of the recuperative trapping stage 3, in particular to a particular portion of the first portion of the recuperative trapping stage 3. In the example as illustrated in FIG. 1, the cooler 1 comprises two cold heads or stages, a first heat exchanger 4 arranged inside the vacuum can 2 which is thermally coupled, or at least configured to be coupleable, with the first cold head or stage of the cooler 1 and a second heat exchanger 5 arranged inside the vacuum can 2 which is thermally coupled, or at least configured to be coupleable, with the second cold head or stage of the cooler 1. Both heat exchangers are further thermally coupled, or at least configured to be thermally coupleable, with at least a part of the recuperative trapping stage 3, in particular with at least one part of the first portion of the recuperative trapping stage 3. Each heat exchanger 4, 5 is or may be thereby thermally connected to a different cold stage of the cooler 1.

The thermal coupling 9 may additionally or alternatively be a thermal link, in particular a controlled or controllable thermal link. The thermal coupling or link 9 may be controlled and/or regulated, or at least configured to be controlled and/or regulated, manually or automatically, for example by means of a control unit, in particular of a gas handling system.

The fluid connection between the first and the second portion may in particular be arranged at the position of a heat exchanger, in particular of the heat exchanger configured to be thermally coupled or at least configured to be coupleable with the coldest head or stage of the cooler 1 with regard to a cooling or cooled state of the refrigerator.

At least a part of the first and/or of the second section of the recuperative trapping stage 3 may be arranged at room temperature in an outside of the vacuum can 2.

In a state of use of the refrigerator, the fluid being conveyed or led through the recuperative trapping stage 3 is therefore led from room temperature throughout the first section and cooled at the heat exchanger(s), impurities being trapped on the wall surfaces of the first and/or second portion, in particular at the coldest points, for example in the region of the coldest heat exchanger. Then, the fluid flows through the fluid communication portion into the second portion of the recuperative trapping stage 3 back to room temperature, where it is then introduce into the condensing line 6. During transit of the fluid flowing through the second portion, the fluid exchanges heat with the incoming fluid of the first portion inducing almost no or zero thermal load.

Fluid flowing through the condensing line has already been cleaned from some impurities during transit through the recuperative trapping stage 3 and reaches the first trapping stage 7 being in particular thermally connected and/or at least configured to be thermally coupleable with a cold stage of the cooler 1, in particular of a first stage of the cooler 1, for example by means of a thermal coupling or link 9 as discussed before for the other thermally coupled elements of the refrigerator. Remaining impurities of the fluid are there at least partially removed.

Further, a heat exchanger 8 arranged in the vacuum can 2 may be thermally coupled or at least configured to be thermally coupleable with the regenerator of the pulse tube. The heat exchanger 8 may further be thermally coupled or at least configured to be coupleable with a portion of the condensing line 6, in particular a portion downstream the first trapping stage 7 and/or upstream of a second trapping stage arranged at s second cooling stage of the cooler 1. As for the heat exchangers 4 and 5 of the recuperative trapping stage 3, the thermal coupling may additionally or alternatively be a thermal link or thermo-switch, in particular a controlled or controllable thermal link or thermo-switch. The thermal coupling, link or switch 9 may be controlled and/or regulated, or at least configured to be controlled and/or regulated, manually or automatically, for example by means of a control unit, in particular of a gas handling system. The fluid flowing through this portion of the condensing line is additionally cooled by heat exchange with the regenerator, providing improved properties, in particular cooling properties of the complete refrigerator. In particular, the cooling time of the refrigerator may be reduced. This may occur independently of the presence or absence of the inventive recuperative trapping stage 3.

The condensing line 6 may comprises further cold trap(s) thermally coupled with other stages, in particular colder stages of the refrigerator as illustrated in FIG. 1. As illustrated, the condensing line may comprise a second cold trap stage thermally coupled or coupleable with the second stage of the pulse tube, even further remaining impurities being thus trapped.

FIG. 2 shows, in a simplified illustration, a second exemplary refrigerator according to the present invention.

This second embodiment bases on the embodiment of FIG. 1, wherein an additional recuperative trapping stage 3 has been mounted in series with the recuperative trapping stage 3 of FIG. 1 as previously discussed. It is possible to have more than one additional recuperative trapping stages 3 mounted in series with the recuperative trapping stage 3 of FIG. 1.

For the features of the single elements having the same reference number, it is referred to the description of FIG. 1. Even If the valves 11 and the valve arrangement 10 of FIG. 1 are not explicitly illustrated in FIG. 2, they may however be encompassed in any further exemplarily embodiment of the present invention.

The connection between the at least two recuperative trapping stages 3 may be permanent or detachable, but at least fluid-tight, in particular vacuum-tight.

It may be possible to use, by-pass and/or separate at least one recuperative trapping stage 3 independently from the other one(s), in particular without interrupting the complete fluid flow through the condensing line 6. This may be achieved by means of a respective manipulation of corresponding valves of the respective recuperative trapping stages 3, gas handling system and/or of the refrigerator (not illustrated).

As illustrated in FIG. 2 the additional recuperative trapping stage 3 is connected or configured to be connected to a fluid supply input or system on one side, and at its fluid output side to a further recuperative trapping stage 3. Thereby, the additional recuperative trapping stage 3 has the same or similar features than the recuperative trapping stage 3 discussed in FIG. 1.

In particular, the additional recuperative trapping stage 3 comprises at least one heat exchanger arranged inside the vacuum can 2 which is thermally coupled, or at least configured to be coupleable, with the at least one cold head or stage of the cooler 1 and to at least a part of the additional recuperative trapping stage 3, in particular to a particular part of the first portion of the additional recuperative trapping stage 3. Alternatively or additionally, at least one of the heat exchanger of the additional recuperative trapping stage 3 may be thermally coupled, or at least configured to be coupleable, with a corresponding heat exchanger of (one) of the further recuperative trapping stage(s) 3.

LIST OF REFERENCE NUMERALS

1 Pulse tube cooler, GM cooler, cooler
2 Main or common vacuum space
3 Recuperative cryo-trapping stage(s)
4 Recuperative cryo-trapping stage, $1^{st}$ stage heat exchanger
5 Recuperative cryo-trapping stage, $2^{nd}$ stage heat exchanger
6 Condensing line
7 Condensing line, pulse tube $1^{st}$ stage trapping stage
8 Condensing line, pulse tube $2^{nd}$ stage regenerator heat exchanger
9 Thermal coupling and/or thermal link
10 Optional servicing valve arrangement
11 Optional servicing valves

The invention claimed is:

1. A refrigerator, comprising:
a vacuum can,
at least one pulse tube or Gifford-McMahon cooler having at least two cold stages, the cooler being arranged in the vacuum can of the refrigerator,
at least one first recuperative trapping stage, each of the at least one first recuperative trapping stage comprising at least one first portion and at least one second portion configured for conveying fluids, wherein the first portion is in fluid communication with the second portion and at least one part of the second portion is arranged within the first portion, and
at least a condensing line arranged downstream of the at least one first recuperative trapping stage with regard to a fluid direction in a state of use of the refrigerator, wherein at least one portion of the condensing line is arranged in an outside of the vacuum can,
wherein at least two different parts or sections of the first portion of each of the at least one first recuperative trapping stage are respectively thermally coupled, or at least configured to be respectively thermally coupleable, to different cold stages of the at least one pulse tube or Gifford-McMahon cooler,
wherein at least a part of the at least one first recuperative trapping stage is arranged within the vacuum can and at least another part of the at least one first recuperative trapping stage is arranged in an outside of the vacuum can,
the refrigerator further comprising at least one further recuperative trapping stage mounted in series with the at least one first recuperative trapping stage and/or at least one cold trap arranged in the at least one condensing line.

2. A refrigerator according to claim 1, wherein the at least one first recuperative trapping stage and at least one further recuperative trapping stage are mounted in series, each of the at least one further recuperative trapping stage comprising at least one first portion and at least one second portion configured for conveying fluids, wherein the first portion is in fluid communication with the second portion and at least one part of the second portion is arranged within the first portion, wherein at least a part of each respective first portion of each recuperative trapping stage is thermally coupled, or at least configured to be thermally coupleable, to a cold stage of the at least one pulse tube or Gifford-McMahon cooler of the refrigerator respectively and/or to a part of the first portion of at least one other recuperative trapping stage.

3. A refrigerator according to claim 1, wherein each of the at least one further recuperative trapping stage mounted in series with the at least one first recuperative trapping stage has at least one first portion and at least one second portion configured for conveying fluids, wherein the first portion is in fluid communication with the second portion and at least one part of the second portion is arranged within the first portion, wherein at least two different parts or sections of the first portion of each of the at least one further recuperative trapping stage are respectively thermally coupled, or at least configured to be respectively thermally coupleable, to different cold stages of the at least one pulse tube or Gifford-McMahon cooler, and wherein the at least two different parts or sections of the first portion of each of the at least one first recuperative trapping stage, or of the at least one further recuperative trapping stage, are thermally coupled by means of at least one of a mechanical connection, a thermal link, a thermo-switch, and a heat exchanger.

4. A refrigerator according to claim 1, wherein at least one heat exchanger is attached to, connected with and/or forms part of the first portion of each of the at least one first recuperative trapping stage or of each of the at least one further recuperative trapping stage.

5. A refrigerator according to claim 1, further comprising at least one heat exchanger, wherein the at least one heat exchanger is thermally coupled, or at least configured to be thermally coupleable, to a regenerator of the at least one pulse tube or Gifford-McMahon cooler.

6. A refrigerator according to claim 1, wherein the at least one cold trap is thermally coupled, or at least configured to be thermally coupleable, to at least one stage of the at least one pulse tube or Gifford-McMahon cooler.

7. A refrigerator according to claim 1, wherein the at least one first recuperative trapping stage is not filled with any material for trapping impurities.

8. A refrigerator according to claim 1, wherein each of the at least one first recuperative trapping stage comprises at least one connecting portion configured to be connected or to be connectable with at least one of a fluid supply, a gas-system, the condensing line of a closed-cycle recirculating fluid system, and at least one of the at least one further recuperative trapping stage.

9. A refrigerator according to claim 1, comprising a servicing valve arrangement for by-passing the at least one first recuperative trapping stage.

10. A refrigerator according to claim 1, further comprising:
- a closed-cycle recirculating fluid system,
- wherein the condensing line forms part of the closed-cycle recirculating fluid system, so that fluid flowing out the at least one first recuperative trapping stage is conveyed through the at least one portion of at least one of the at least one first recuperative trapping stage arranged outside the vacuum can before being introduced into the condensing line.

11. A method of cleaning at least one recuperative trapping stage of a refrigerator according to claim 9, further comprising:
- by-passing the at least one first recuperative trapping stage using the servicing valve arrangement; and
- at least one of the step of warming up and/or interrupting cooling of at least one section of the at least one first recuperative trapping stage, of flushing the at least one first recuperative trapping stage with a cleaning fluid and/or of evacuating the at least one first recuperative trapping stage.

* * * * *